(12) United States Patent
Shen et al.

(10) Patent No.: US 9,233,307 B2
(45) Date of Patent: Jan. 12, 2016

(54) FULLY AUTOMATIC SIMULATION SYSTEM OF AN INPUT DEVICE

(75) Inventors: Hsing-Yuan Shen, Taichung (TW); Chun-Cheng Lin, Taichung (TW)

(73) Assignee: Innomind Solution Company Limited, Taichung (TW)

( * ) Notice: Subject to any disclaimer, the term of this patent is extended or adjusted under 35 U.S.C. 154(b) by 589 days.

(21) Appl. No.: 13/588,166

(22) Filed: Aug. 17, 2012

(65) Prior Publication Data

US 2014/0049461 A1   Feb. 20, 2014

(51) Int. Cl.
| | |
|---|---|
| G06F 9/44 | (2006.01) |
| G06F 13/10 | (2006.01) |
| G06F 13/12 | (2006.01) |
| A63F 13/22 | (2014.01) |
| G06F 3/038 | (2013.01) |

(52) U.S. Cl.
CPC .............. *A63F 13/22* (2014.09); *G06F 3/038* (2013.01)

(58) Field of Classification Search
None
See application file for complete search history.

(56) References Cited

U.S. PATENT DOCUMENTS

| | | | | |
|---|---|---|---|---|
| 2002/0147041 | A1* | 10/2002 | Cheng | 463/37 |
| 2005/0221895 | A1* | 10/2005 | Lum et al. | 463/39 |
| 2005/0234695 | A1* | 10/2005 | Wang et al. | 703/19 |
| 2011/0009192 | A1 | 1/2011 | Aronzon et al. | |

FOREIGN PATENT DOCUMENTS

| | | |
|---|---|---|
| CN | 101650656 | 2/2010 |
| CN | 101751197 | 6/2010 |
| TW | M253847 U | 12/2004 |
| TW | M344517 U | 11/2008 |

OTHER PUBLICATIONS

"Office Action of Taiwan Counterpart Application", issued on Jul. 2, 2014, p. 1-p. 10.
Meng et al., "Inputware: A Unified Access Interface for Multimodal Input Based on Layered Interaction Primitives," Harmonious Man-Machine Environment, 2008, pp. 242-247.
Dragicevic et al., "The Input Configurator toolkit: towards high input adaptability in interactive applications," Proceedings of the working conference on Advanced visual interfaces , 2004, pp. 244-247.
Fernandes et al., "Extensible middleware framework for multimodal interfaces in distributed environments," Proceedings of the 9th international conference on Multimodal interfaces, 2007, pp. 216-219.
"Office Action of China Counterpart Application" , issued on Jan. 7, 2015, p. 1-p. 9.

* cited by examiner

*Primary Examiner* — Omar Fernandez Rivas
*Assistant Examiner* — Bernard E Cothran
(74) *Attorney, Agent, or Firm* — Jianq Chyun IP Office

(57) ABSTRACT

A fully automatic simulation system for an input device permits storage in advance of executable applications and associated simulation setting flies into a database, and then combination of the detection, automatic data searching and matching, transmission and conversion, enabling rapid and convenient operation by the users, whenever they operate various applications or whether they adopt a keyboard, mouse or joystick as the simulation controller.

10 Claims, 6 Drawing Sheets

| Application | Keyboard | Mouse | Joystick | Touch screen | Simulator A | Simulator B | ... |
|---|---|---|---|---|---|---|---|
| Forward | Key W | None | Push forward the joystick | Icon button ↑ | Push forward the joystick | Front key | ... |
| Backward | Key X | None | Push backward the joystick | Icon button ↓ | Push backward the joystick | Rear key | ... |
| Rightward | Key D | None | Push rightward the joystick | Icon button → | Push rightward the joystick | Left key | ... |
| Leftward | Key A | None | Push leftward the joystick | Icon button ← | Push leftward the joystick | Right key | ... |
| Shooting | Space bar | Click the left key of the mouse | None | Icon button F | Press the round key | Press the round key | ... |
| Bombing | Key P | Double-click the left key of the mouse | None | Icon button B | Double press the round key | Double press the round key | ... |
| Screen coordinate | None | Shift coordinate of the mouse | None | Touch point coordinate | Slide coordinate | Slide coordinate | ... |
| Number 0 | Key 0 | None | None | Icon button 0 | Key 0 | Key 0 | ... |
| Number 1 | Key 1 | None | None | Icon button 1 | Key 1 | Key 1 | ... |
| Number 2 | Key 2 | None | None | Icon button 2 | Key 2 | Key 2 | ... |
| ... | | | | | | | |

FIG.2

| Electronic thermometer | Keyboard | Mouse | Joystick | Electronic scale | Electronic thermometer | ... |
|---|---|---|---|---|---|---|
| Single digit | Numerical keys | None | None | Single digit | Single digit | ... |
| Ten digits | Numerical keys | None | None | Ten digits | Ten digits | ... |
| Hundred digits | Numerical keys | None | None | Hundred digits | Hundred digits | ... |
| ... | ... | ... | ... | ... | ... | ... |

FIG.3

The simulation hardware is linked to near-end computer via the first communication module; when the simulator software detects successful linking of the simulation hardware and near-end computer, the simulation hardware is required to transmit its type.

⇩

The simulator software receives the type of simulation hardware and stores into the second memory of near-end computer.

⇩

The database conducts searching and matching by the selected applications to upload corresponding simulation setting files from the simulation setting file database to near-end computer, and then store the applications and simulation setting files into the second memory of the near-end computer.

⇩

The simulator software could display the operating commands and data input methods of existing simulation hardware and corresponding applications according to the type of simulation hardware and contents of the simulation setting file.

⇩

The user could activate the applications and start to use the input module of the simulation hardware.

⇩

The simulator software will, according to the type of simulation hardware and contents of the simulation setting file, convert automatically the operating commands or input data of the first memory from the simulation hardware into those of the input device.

⇩

Operate the applications or input data to the applications.

FIG.4

```
┌─────────────────────────────────────────────────────┐
│ The simulation hardware is linked to near-end       │
│ computer via the first communication module; when   │
│ the simulator software detects successful linking   │
│ of the simulation hardware and near-end computer,   │
│ the simulation hardware is required to transmit     │
│ its type.                                           │
└─────────────────────────────────────────────────────┘
                          ⇩
┌─────────────────────────────────────────────────────┐
│ The simulator software receives the type of         │
│ simulation hardware and stores into the second      │
│ memory of near-end computer.                        │
└─────────────────────────────────────────────────────┘
                          ⇩
┌─────────────────────────────────────────────────────┐
│ The database conducts searching and matching by     │
│ the selected applications to upload corresponding   │
│ simulation setting files from the simulation        │
│ setting file database to near-end computer, and     │
│ then store the applications and simulation setting  │
│ files into the second memory of the near-end        │
│ computer.                                           │
└─────────────────────────────────────────────────────┘
                          ⇩
┌─────────────────────────────────────────────────────┐
│ The simulator software could display the operating  │
│ commands and data input methods of existing         │
│ simulation hardware and corresponding applications  │
│ according to the type of simulation hardware and    │
│ contents of the simulation setting file.            │
└─────────────────────────────────────────────────────┘
                          ⇩
┌─────────────────────────────────────────────────────┐
│ The user could activate the applications and start  │
│ to use the input module of the simulation hardware. │
└─────────────────────────────────────────────────────┘
                          ⇩
┌─────────────────────────────────────────────────────┐
│ The simulator software will, according to the type  │
│ of simulation hardware and contents of the          │
│ simulation setting file, convert automatically the  │
│ operating commands or input data of the first       │
│ memory from the simulation hardware into those of   │
│ the input device.                                   │
└─────────────────────────────────────────────────────┘
                          ⇩
┌─────────────────────────────────────────────────────┐
│ Operate the applications or input data to the       │
│ applications.                                       │
└─────────────────────────────────────────────────────┘
```

FIG.5

FULLY AUTOMATIC SIMULATION SYSTEM OF AN INPUT DEVICE

CROSS-REFERENCE TO RELATED U.S. APPLICATIONS

Not applicable.

STATEMENT REGARDING FEDERALLY SPONSORED RESEARCH OR DEVELOPMENT

Not/applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a fully automatic simulation system, and more particularly to an innovative one which enables users to operate more easily the input device (e.g., keyboard, mouse, joystick, touch screen, body-operated controller).

2. Description of Related Art Including Information Disclosed Under 37 CFR 1.97 and 37 CFR 1.98

With the development of ever-changing network technologies in recent years, the users could easily download all kinds of games or applications (e.g. APP) to their own computers or mobile phones via PCs, notebook computers, tablet PCs or smart phones remotely (e.g., website servers and APP on-line shops). Yet, preset input devices for the users are mainly limited to keyboards and mouse, and only a few support commercially available joysticks. In addition, some special joysticks could be purchased to operate specific games or applications.

For the purpose of convenient operation, a universal joystick or operating device matching various games or applications can be designed to improve substantially the ease of operation.

Currently, a keyboard and mouse simulation software has been developed by program designers, allowing the joysticks to simulate keyboards and mouse functionally. When the games or applications support only the keyboards and mouse other than common joysticks, the common joysticks could functionally correspond to the keyboards and mouse required by the games or applications via the help of so-called "keyboard & mouse simulation software". For example: if the right key of a joystick corresponds to key A of the keyboard, when the user presses the right key of the joystick, this means key A of the keyboard is pressed. Yet, this method is unavailable if the games or applications do not support the keyboard and mouse simulation software. As for patents, technologies pertaining to keyboards and mouse simulators, such as "a joystick structure capable of defining the computer keyboard" (TW M253847), and "a computer keyboard and mouse simulator" (TW M344517), have been disclosed in relevant patents. However, the aforementioned patent technologies require the users to set the keyboards and mouse simulators according to the operating modes specified for various games or applications. Hence, it is learnt that main problems against existing keyboard and mouse simulator technologies include:

First, for the purpose of setting of keyboards and mouse simulators, the users have to firstly understand the operating modes of keyboards and mouse specified for various games or applications.

Second, the users must keep abreast of the setting methods of keyboards and mouse simulation software.

Third, when different keyboards and mouse simulators are used for the same games or applications, the users must spend time on resetting of the keyboards and mouse simulators, leading to waste of time and inconvenience for the game players.

Fourth, for a certain game or application, the setting document for the keyboards and mouse simulation software cannot be shared by other users for repetitive use.

Thus, to overcome the aforementioned problems of the prior art, it would bean advancement if the art to provide an improved structure that can significantly improve the efficacy.

Therefore, the inventors have provided the present invention of practicability after deliberate design and evaluation based on years of experience in the production, development and design of related products.

BRIEF SUMMARY OF THE INVENTION

The system disclosed in the present invention permits to store in advance executable applications and associated simulation setting files into the database, and then combine the detection, automatic data searching and matching, transmission and conversion, enabling rapid and convenient operation by the users, whenever they operate various applications or whether they adopt keyboard, mouse or joystick as the simulation controller. The advantages are as follow:

First, direct use is possible since the users are not required to learn in advance the operating commands of the input device specified by the applications.

Second, after uploading the applications and simulation setting files, the users could directly operate the applications or input data to the applications by the simulation hardware, without need of setting the simulator software.

Third, when the same application is operated by different simulation hardware, the users could utilize different simulation hardware without resetting of the simulator software.

Fourth, the users could share with others their own applications and simulation setting files by uploading into the program database and simulation setting file database.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 2 is an operation table of applications unique to a preferred embodiment of the simulation setting file of the present invention.

FIG. 3 is an operation table of applications unique to another preferred embodiment of the simulation setting file of the present invention.

FIG. 4 is a block diagram showing the operating steps of the present invention.

FIG. 5 is a block diagram of another preferred embodiment showing the operating steps of the present invention.

DETAILED DESCRIPTION OF THE INVENTION

Figure 1:
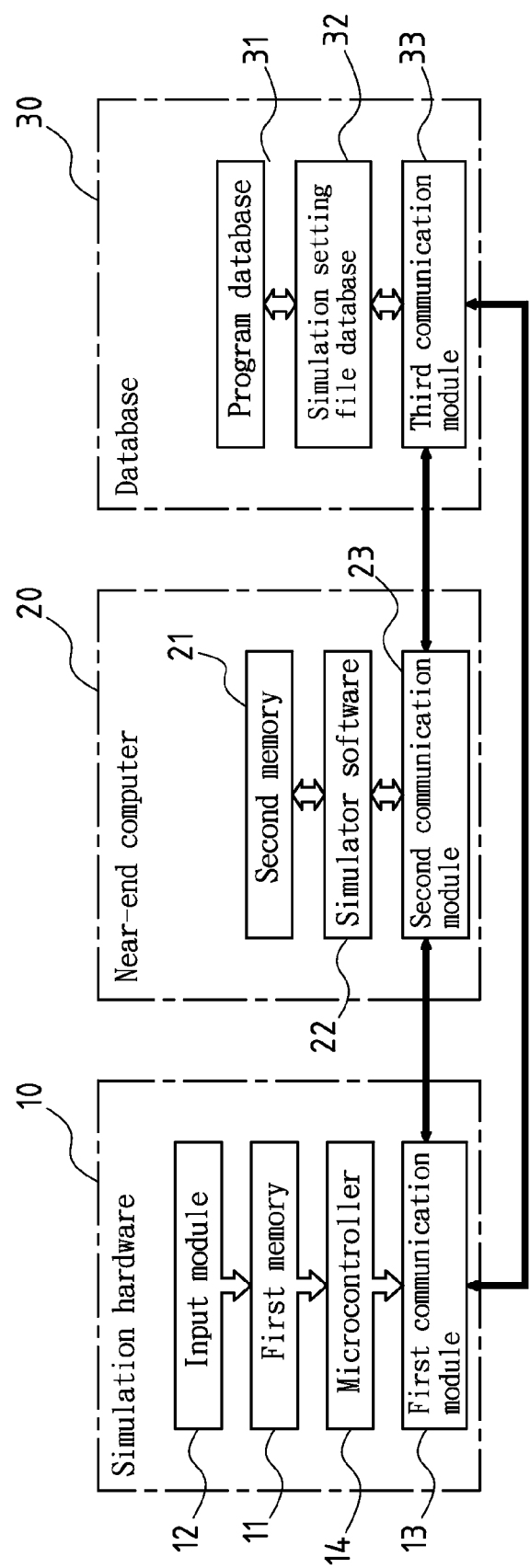
FIG. 1 is an abbreviated view of the system infrastructure of the present invention.

FIGS. 1-2 depict preferred embodiments of a full automatic simulation system of input device of the present invention, which, however, are provided for only explanatory objective for patent claims.

Said full automatic simulation system of input device comprises at least a simulation hardware 10, used for simulation of input devices including: keyboard, mouse, joystick, touch screen and body-operated controller (e.g., Wii Remote). The present invention is provided with a single simulation hardware 10, or some equivalent or different simulation hardware 10. The simulation hardware 10 comprises of: a first memory 11, used to store at least the type of the simulation hardware 10 and the operating commands or data input by the user; an input module 12, linked to the first memory 11, and set into interfacing modes such as keys, rocker, slider, trigger, shaker, music keys, electronic drum and scale, so as to store data into the first memory 11; a first communication module 13, used to provide an external data information transfer interface for the simulation hardware 10; a microcontroller 14, linked to the first memory 11 and the first communication module 13, and used to transmit via the first communication module 13 the operating commands or data stored in the first memory 11, or convert the operating commands or data into the input device's operating commands or data and then transmit via the first communication module 13. Of which, the first memory 11 may be embedded into the microcontroller 14 or arranged out of the microcontroller 14;

A near-end computer 20 is designed into any of PC, tablet PC or smart mobile phone. The near-end computer 20 comprises of: a second memory 21, used to store the applications, simulation setting files and types of simulation hardware; a simulator software 22, linked to the second memory 21, capable of converting the operating commands or data input by simulation hardware 10 into those of input device, according to contents of the simulation setting files. If the operating commands or data input by the simulation hardware 10 have been converted, these could be directly used to operate the applications or input data to the applications (namely, the simulator software no longer executes conversion). A second communication module 23 is linked to the simulator software 22. Data transmission can be realized between the second communication module 23 and the first communication module 13 of the simulation hardware 10, thus providing data transmission functions between the near-end computer 20 and the simulation hardware 10.

A database 30 is set into any of near-end computer 20, remote or cloud website server or permanent memory unit. The database 30 comprises of: a program database 31, used to store game software, APP applications. Flash applications and webpage programs; a simulation setting file database 32, linked to the program database 31, and used to store simulation setting files matching various applications; a third communication module 33, linked to the simulation setting file database 32. Data transmission can be realized among the third communication module 33, the first communication module 13 of the simulation hardware 10 and the second communication module 23 of the near-end computer 20, thus providing data transmission functions between the database 30 and near-end computer 20 or simulation hardware 10. Of which, said permanent memory unit includes: CD-ROM, portable disk and HD.

Of which, simulation setting files can be stored into the simulation setting file database 32 in any of the following formats: plain texts (.txt), binary files (.bin), webpage files (.htm, .html, .java, .php) or datasheets defined by database software (Access, MS SQL, Oracle, MySQL). Also, said simulation setting files can be provided in advance by the website service companies or users. If the downloaded applications are absent of preset simulation setting files, the simulator software 22 could check the webpage unique to the operating instructions or guides of the applications and then convert into the simulation setting files. The simulation setting files can also be designed to be embedded into the applications.

Of which, data transmission among the first, second and third communication modules 13, 23, 33 includes wireless or wired transmission.

Of which, the simulation hardware 10 can be set into the near-end computer 20 as an integrated pattern, or out of the near-end computer 20 as an independent pattern.

Of which, die first and second memories 11, 21 can be designed into any of the following types: ROM, RAM, dynamic memory, static memory and flash memory.

FIG. 2 depicts a preferred embodiment of the simulation setting file of the present invention showing the operation table of an application, wherein the field "application" records separately various operations of the application, such, as forward, backward, leftward, rightward, shooting, bombing, screen coordinate, number 0, number 1 and 2. The field "keyboard" records keying operations correspondingly to the field "application", such as key W, key X, key D, key A, space bar, key P, none, key 0, key 1, key 2. The field "mouse" records separately the mouse operations correspondingly to the field "application", such as none, none, none, pone, click the left key of the mouse, double-click the left key of the mouse, shift coordinate of the mouse, none, none and none. The field "joystick" records separately the joystick operations correspondingly to the field "application", such as push forward the joystick, push backward the joystick, push rightward the joystick, push leftward the joystick, none, none, none, none and none. The field "touch screen" records separately the touch screen operations correspondingly to the field "application", such as icon button ↑, icon button ↓, icon button →, icon button ←, icon button F, icon button B, touch point coordinate, icon button 0, icon button 1 and icon button 2. The field "simulator A" records separately the operating commands of the simulation software correspondingly to the field, "application", such as push forward the joystick, push backward the joystick, push rightward the joystick, push leftward the joystick, press the round key, double press the round, key, slide coordinate, key 0, key 1 and key 2. The field "simulator B" records separately the operating commands of the simulation, software correspondingly to the field "application", such as front key, rear key, left key, right key, press the round key, double press the round key, slide coordinate, key: 0, key 1 and key 2. The operating commands or data input methods for different kinds of simulation hardware could be added flexibly into the simulation setting file.

Referring also to FIG. 1, after the user uploads applications and simulation setting files from the program database 31 and simulation setting file database 32 to the second memory 21 of the near-end computer 20, the simulator software 22 could, depending on the simulation hardware types sent by the simulation hardware 10, search and compare the contents of the simulation setting file, and then convert the operating commands or data sent by the simulation hardware 10 into those of the input device, enabling to simulate functionally the input device using the simulation hardware 10. For instance, when simulation hardware B is linked to near-end computer 20, and if the user "press the round key" in the input module 12, the simulator software will generate, for the application, a command of "press left key of the mouse" according to the simulation setting file disclosed in FIG. 2, and then issue the operating command of "shooting" to the application. Moreover, when simulation hardware A is linked to the near-end computer, and if the user uses a slider in the input module 12 to generate "slide coordinate", the simulator software will generate, for the application, "touch point coordinate" corresponding to the touch screen and "mouse shift coordinate" corresponding to the mouse according to the simulation setting file in FIG. 2, so as to control the application's cursor or pointer position corresponding to the icon coordinate of the application.

Figure 6:
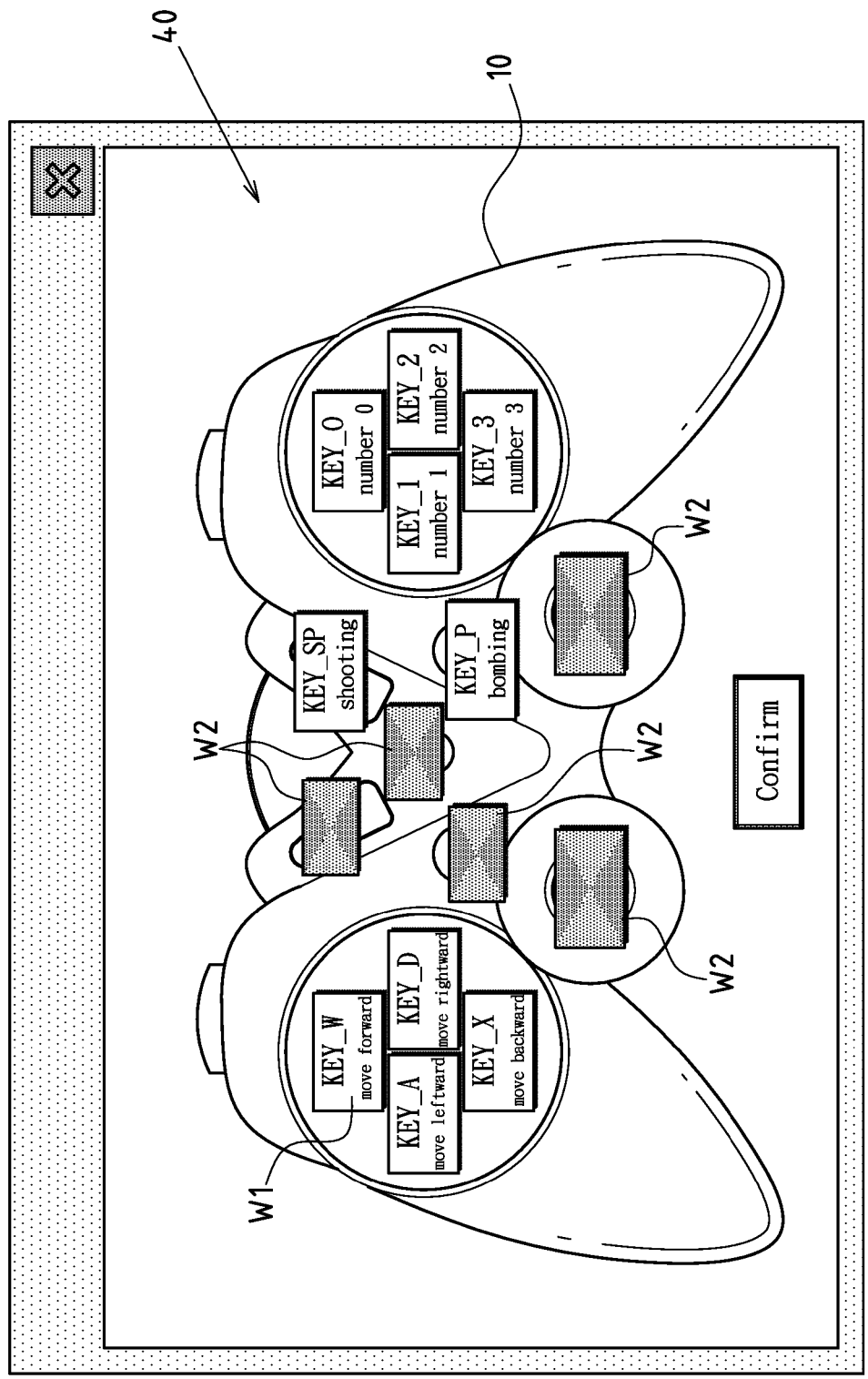
FIG. 6 is an application view of the present invention showing the display pattern of the simulation hardware's operating commands.

Said simulator software could also display the operating commands and data input methods of existing simulation hardware and corresponding applications according to the type of simulation hardware and contents of the simulation setting file, allowing the user to learn the operating modes of the simulation hardware. FIG. 6 depicts the embodiment of an operating command interface 40 shown on the screen prior to execution of the applications (e.g. games), wherein if the simulation hardware 10 shown on the interface 40 is a remote controller, the functional meanings marked by the keys of the simulation hardware 10 will be indicated on the interface 40. For example, "KEY_W" and "forward" keys (block shown by W1 in the figure) marked in the simulation hardware 10 correspond to key W of existing keyboard and "forward" function of the application. If no key of corresponding functions is marked in the simulation hardware 10 (blocks shown by W2s in the figure), this indicates that the application lacks of corresponding functions, namely, such key does not function when the application is operated.

According to another feasible implementation mode (note: refer to FIG. 1 for the symbols of system components), the simulation hardware 10 could download the simulation setting files from the simulation setting file database 32 to the first memory 11 of the simulation hardware 10, then the microcontroller 14 in the simulation hardware 10 will, according to the types of the simulation hardware and the contents of the simulation setting file, convert the operating commands or data generated by the input module 12 into those of the input device, then transmit to near-end computer 20 through the first communication module 13, so as to directly operate the application or input data to the application.

FIG. 3 (note: refer to FIG. 1 for the symbols of system components) depicts another embodiment of said simulation setting file in the present invention, which is mainly applied to an input module as an electronic scale, electronic thermometer or similar electronic device capable of generating data. After the electronic scale, an electronic thermometer detects the weight of the user or ambient temperature, the data will be firstly stored into the first memory 11 of the simulation hardware 10, then divided into figures of single digit, ten or hundred digits by the microcontroller 14 in simulation hardware 10. Next, the simulation hardware 10 transmits data via the first communication module 13 to the simulator software 22 of near-end computer 20, which converts automatically into numerical keys on the keyboard. For example, when the single digit is 3, the simulator software 22 will generate numerical key 3 of the keyboard for the application. According to another feasible way, the microcontroller 14 of the simulation hardware 10 firstly converts data into the numerical key on the keyboard and send directly to the applications in the near-end computer 20. Finally, the applications combine the received single digits, ten or hundred digits to form complete data.

Referring also to FIG. 4 (note: refer to FIG. 1 for the symbols of system components), the operating steps of full automatic simulation system of said input device in the present invention include:

A. The simulation hardware 10 is linked to near-end computer 20 via the first communication module 13. When the simulator software 22 detects successful linking of the simulation hardware 10 and near-end computer 20, the simulation hardware 10 is required to transmit its type.

B. The simulator software 22 receives the type of simulation hardware and stores into the second memory 21 of near-end computer 20.

C. The database 30 conducts searching and matching by the selected applications to upload corresponding simulation setting files from the simulation setting file database 32 to near-end computer 20, and then store the applications and simulation setting files into the second memory 21 of the near-end computer 20.

D. The simulator software 22 could display the operating commands and data input methods of existing simulation hardware 10 and corresponding applications according to the type of simulation hardware 10 and contents of the simulation setting file, allowing the user to learn the operating modes of the simulation hardware 10.

E. The user could activate the applications and start to use the input module 12 of the simulation hardware 10 (note: after the user knows about the operating modes of the simulation hardware).

F. The simulator software 22 will, according to the type of simulation hardware and contents of the simulation setting file, convert automatically the operating commands or input data of the first memory 11 from the simulation hardware 10 into those of the input device.

G. Operate the applications or input data to the applications.

In the aforementioned operating steps, if the simulation setting file is designed to be embedded into the applications, the user could directly upload the applications. Moreover, the simulation hardware 10 could also download via the first communication module 13 the simulation setting file from the simulation setting file database 32 and store into the first memory 11 of the simulation hardware 10.

Additionally, the aforementioned step C could also be replaced in the following ways (in conjunction with FIG. 5): the database 30 conducts searching and matching by the selected applications to upload corresponding simulation setting files from the simulation setting file database 32 to the simulation hardware 10, then store into the first memory 11, and upload the applications to the near-end computer 20. In Step F, the simulation hardware 10 could, according to the type of the simulation hardware 10 and contents of the simulation setting file, automatically convert the operating commands or data stored in the first memory 11 into those of the input device, and then transmit to near-end computer 20 via the first communication module 13.

We claim:

1. A full automatic simulation system of an input device, which comprising:

at least a simulation hardware, used for simulation of the input devices including: keyboard, mouse, joystick, touch screen and body-operated controller; said simulation hardware comprising of:
a first memory, used to store at least one type of the simulation hardware and the operating commands or data input by the user;
an input module, finked to the first memory, and set into interfacing modes for operation or data input by the users, so as to store data into the first memory;
a first communication module, used to provide an external data information transfer interface for the simulation hardware;
a microcontroller, linked to the first memory and the first communication module, and used to transmit via the first communication module the operating commands or data stored in the first memory, or convert the operating commands or data into those of the input device and then transmit via the first communication module;
a near-end computer, comprising of:
a second memory, used to store the applications, simulation setting files and types of simulation hardware;
a simulator software, linked to the second memory, converting the operating commands or data input by simulation hardware into those of input device, according to contents of the simulation setting files; using said converting operating commands to operate the applications or input data to the applications;
a second communication module, linked to the simulator software;
data transmission is realized between the second communication module and the first communication module of the simulation hardware, thus providing data transmission functions between the near-end computer and the simulation hardware; a database, comprising of:
a program database, used to store game software, applications, Flash applications and webpage programs;
a simulation setting file database, linked to the program database, and used to store simulation setting files matching various applications;
a third communication module, linked to the simulation setting file database;
data transmission is realized among the third communication module, the first communication module of the simulation hardware and the second communication module of near-end computer, thus providing data transmission functions between the database and near-end computer or simulation hardware,
wherein when the simulation hardware is linked to the near-end computer, one of the applications and the corresponding simulation setting file are loaded from the database into the near-end computer, and the simulator software searches and
compares the contents of the simulation setting file, and then converts the operating commands or data sent by the simulation hardware into those of the input device according to the simulation hardware types,
wherein two different operating commands or input data respectively sent by two types of the simulation hardwares are converted to the same operating command or input data to one of the applications.

2. The system, defined in claim 1, wherein said system is only provided with a single simulation hardware, or some equivalent or different simulation hardware.

3. The system defined in claim 1, wherein said database is set into any of near-end computer, remote or cloud website server or permanent memory unit; the database comprises of: CD-ROM, portable disk, hard disk; data transmission among the first, second and third communication modules includes wireless or wired transmission; the input module of the simulation hardware is set into interfacing modes such as keys, rocker, slider, trigger, shaker, music keys, electronic drum and scale; the near-end computer is designed into any of Personal Computer, tablet Personal Computer or smart mobile phone.

4. The system defined in claim 1, wherein said first memory may be embedded into the microcontroller or arranged out of the microcontroller.

5. The system defined in claim 1, wherein simulation setting files can be stored into the second memory of near-end computer in any of the following formats: plain texts (.txt), binary files (.bin), webpage files (.htm, .html, Java, .php) or datasheets defined by database software (Access, MS SQL, Oracle, MySQL).

6. The system defined in claim 1, wherein said simulation setting files are provided in advance by a website service companies or users; the simulator software checking a webpage unique to the operating instructions or guides of the applications and then converting them into the simulation setting files; the simulation setting files can also be designed to be embedded into the applications.

7. The system defined in claim 1, wherein said simulation hardware can be set into the near-end computer as an integrated pattern, or out of the near-end computer as an independent pattern.

8. The system defined in claim 1, wherein said first and second memories can be designed into any of the following types: ROM, RAM, dynamic memory, static memory and flash memory.

9. The system defined in claim 1, wherein the operating steps include:
linking the simulation hardware to the near-end computer via the first communication module; when the simulator software detects successful linking of the simulation hardware and near-end computer, the simulation hardware is required to transmit its type;
receiving by the simulator software the type of simulation hardware and it into the second memory of said near-end computer;
searching the database and matching simulation setting files to various applications to upload simulation setting files from the simulation setting file database to the near-end computer, and storing the applications and simulation setting files into the second memory of the near-end computer;
displaying the operating commands and data input methods of existing simulation hardware and corresponding applications according to the type of simulation hardware and contents of the simulation setting file, allowing the user to learn the operating modes of the simulation hardware;
activating by the user could activate the applications and start to use the input module of the simulation hardware;
converting automatically by the simulation software, the operating commands or input data of the first memory from the simulation hardware into those of the input device, according to the type of simulation hardware and contents of the simulation setting file; and
operating the applications or input data to the applications.

10. The system defined in claim 9, wherein the step of searching the database and matching simulation setting files to various applications to upload simulation setting files from the simulation setting file database to the near-end computer, and storing the applications and simulation setting files into the second memory of the near-end computer further comprising:
  searching the database to match the selected applications to upload corresponding simulation setting files from the simulation setting file database to the simulation hardware, storing them into the first memory, and uploading the applications to the near-end computer;
  wherein in the step of converting automatically by the simulation software, the operating commands or input data of the first memory from the simulation hardware into those of the input device, according to the type of simulation hardware and contents of the simulation setting file, the simulation hardware could, according to the type of the simulation hardware and contents of the simulation setting file, automatically convert the operating commands or data stored in the first memory into those of the input device, and then transmit to near-end computer via the first communication module.

* * * * *